(12) United States Patent
Chen et al.

(10) Patent No.: US 6,400,108 B1
(45) Date of Patent: Jun. 4, 2002

(54) BRUSHLESS DC-MOTOR DRIVING CONTROLLER

(75) Inventors: Hui Chen; Koji Matsuda; Toshiyuki Onizuka, all of Maebashi (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 09/482,108

(22) Filed: Jan. 13, 2000

(30) Foreign Application Priority Data

Jan. 18, 1999 (JP) ............................................ 11-008888

(51) Int. Cl.$^7$ ...................... H01R 39/46; H02K 13/00; H02P 7/50
(52) U.S. Cl. ...................... 318/439; 318/254; 318/430; 318/437
(58) Field of Search ................................ 318/138, 254, 318/439, 430, 437, 376, 433; 68/12.02; 310/180

(56) References Cited

U.S. PATENT DOCUMENTS

| | | | | |
|---|---|---|---|---|
| 5,111,091 A | * | 5/1992 | Bahn | 318/254 |
| 5,382,889 A | * | 1/1995 | Peters et al. | 318/254 |
| 5,625,264 A | * | 4/1997 | Yoon | 318/254 |
| 5,780,983 A | * | 7/1998 | Shinkawa et al. | 318/254 |
| 5,982,067 A | * | 11/1999 | Sebastian et al. | 310/180 |
| 6,041,625 A | * | 3/2000 | Nagai et al. | 68/12.02 |
| 6,122,579 A | * | 9/2000 | Collier-Hallman et al. | 318/433 |

FOREIGN PATENT DOCUMENTS

JP 2563523 9/1996 ............. H02P/6/02

* cited by examiner

*Primary Examiner*—Marlon T. Fletcher
(74) *Attorney, Agent, or Firm*—Sughrue Mion, PLLC

(57) ABSTRACT

A brushless DC-motor driving controller is provided which can significantly reduce torque fluctuations in the brushless DC motor. The brushless DC-motor driving controller uses a position detector, generates rotation-angle signals representing rotor-rotation angles or a part thereof in high resolution, uses the rotation-angle signals, and performs rectangular-wave driving. By using the rotation-angle signals, the brushless DC-motor driving controller compensates for electrical angles corresponding to commutation-position skews in rectangular-wave driving which are caused by armature reaction in a brushless DC-motor.

16 Claims, 10 Drawing Sheets

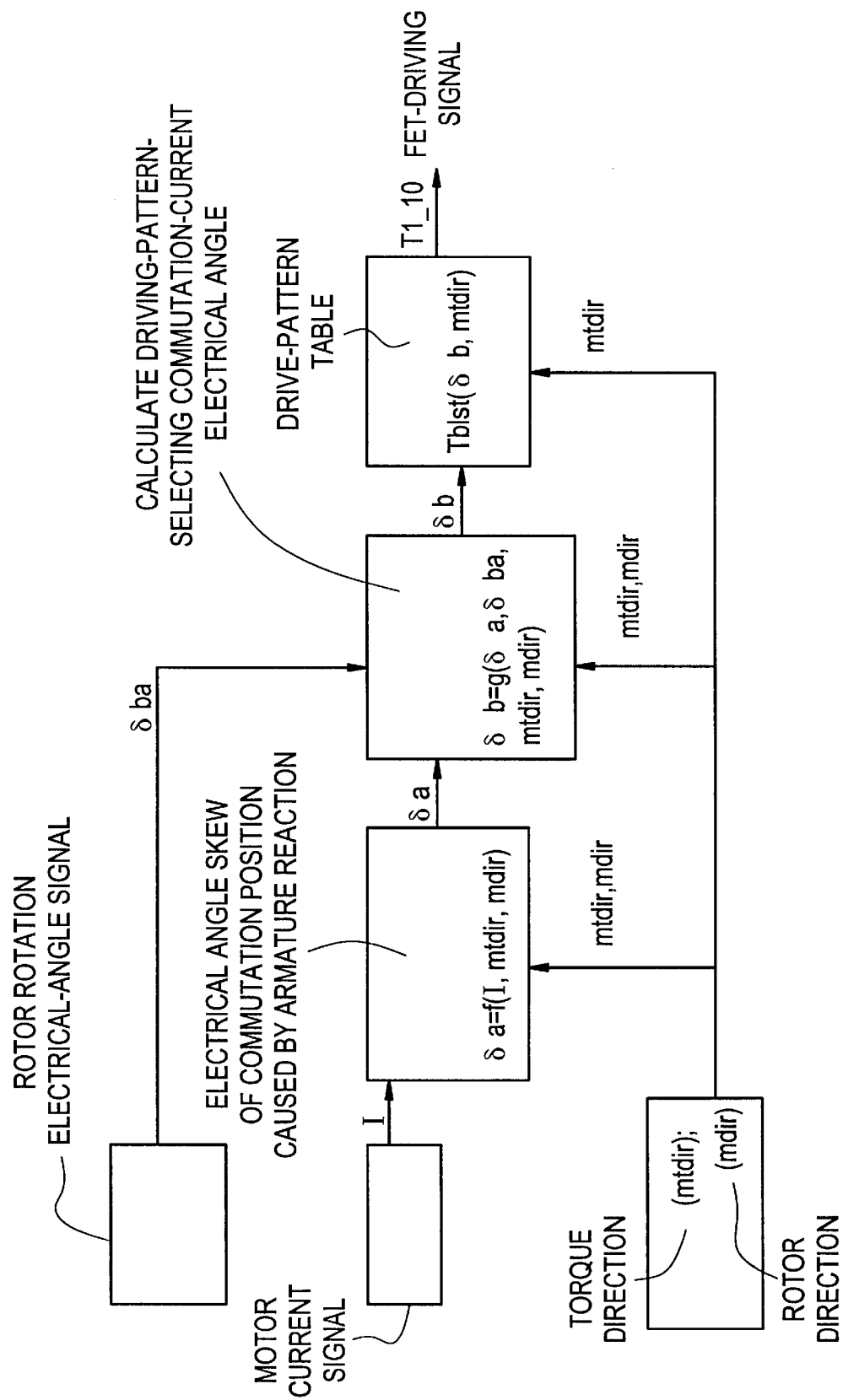

BRUSHLESS DC-MOTOR DRIVING CONTROLLER

BACKGROUND OF THE INVENTION

1. Field of the Invention

The present invention relates to a brushless DC-motor driving controller for driving and controlling a brushless DC-motor. Particularly, the present invention relates to a brushless DC-motor driving controller for suitably minimizing torque fluctuations in a brushless DC-motor.

2. Description of the Related Art

For conventional brushless DC-motors driven with rectangular waves, for example, a small number of Hall elements, as in the cases of three Hall elements for three phases and five Hall elements for five phases, is used to detect rotor positions to generate position-detecting signals. The generated position-detecting signals are used to detect the relative positional relation between the rotor and armature coils, and commutation positions are determined according to the positional relation.

According to requirements for cost reduction, miniaturization, and high output power, however, the torque constant and ampere-turns increase in conventional brushless DC-motors. Proportionally to the increase in ampere-turns, the armature-current magnetomotive force also increases, thereby increasing torque-form skew for each phase.

In the conventional brushless DC-motors, in which a small number of Hall elements is used to determine commutation positions and to perform rectangular-wave driving, phase-current commutation positions are fixed. In this case, addition of skewed torques in the individual phases, as shown in FIG. 1B, causes torque connection to be discontinuous, thereby causing torque fluctuations, as shown in FIG. 1A. Torque fluctuations cause noise during operation of the brushless DC-motor.

With an electrical power steering device of vehicles which use the conventional brushless DC-motor causing torque fluctuations as its power source, when the steering wheel is slowly rotated, torque fluctuations effect steering sensation; and when the steering wheel is rotated quickly, the fluctuations cause noise.

SUMMARY OF THE INVENTION

The present invention has been developed under the above circumstances. A first object of the present invention is to provide a brushless DC-motor driving controller that significantly reduces torque fluctuations in brushless DC-motors. A second object is to provide a brushless DC-motor driving controller that can be used to improve steering sensation and to reduce noise occurrence in electrical power steering devices.

To achieve the described objects, the present invention provides a brushless DC-motor driving controller that uses a position detector, generates a rotation-angle signal representing rotor-rotation angle or a part thereof in high resolution, uses the rotor-rotation signal, and performs rectangular-wave driving. The rotor-rotation signal is used to compensate for an electrical angle corresponding to commutation-position skew in rectangular-wave driving which is caused by armature reaction in a brushless DC-motor.

In this case,,the electrical angle, which correspond to the commutation-position skew in rectangular-wave driving, which is caused by armature reaction in the brushless DC-motor, may be determined by using functions of values representing four operating conditions of normal-rotation driving, inverse-rotation driving, normal-rotation regenerative braking and inverse-rotation regenerative braking, and armature-reaction effects of the brushless DC-motor.

Also, the above-described brushless DC-motor driving controller, which compensates for the electrical angle corresponding to the commutation-position skew in rectangular-wave driving, which is caused by armature reaction in the brushless DC-motor, may be used to drive and control a brushless DC-motor in an electrical power steering device that uses rotation torque of the brushless DC-motor to support forces required for vehicle-wheel steering.

In this case also, the electrical angle corresponding to commutation-position skew in rectangular-wave driving which is caused by armature reaction in the brushless DC-motor may be determined by using functions of values representing four operating conditions of normal-rotation driving, inverse-rotation driving, normal-rotation regenerative braking and inverse-rotation regenerative braking, and armature-reaction effects of the brushless DC-motor.

According to the above, the objects of the present invention, described above, can be achieved, specifically, in the following manner.

The first object of the present invention can be achieved by the brushless DC-motor driving controller that uses a rotation-angle signal so as to compensate for an electrical angle corresponding, to commutation-position skew in rectangular-wave driving, which is caused by an armature reaction in the brushless DC-motor. This allows torque fluctuations in brushless DC-motors to be significantly reduced. The second object of the present invention can be achieved by the brushless DC-motor driving controller that uses the rotation-angle signal to drive and control a brushless DC-motor in an electrical power steering device that uses rotation torque of the brushless DC-motor to support forces required for vehicle-wheel steering. This improves steering sensation in the electrical power steering device, and in addition, minimizes noise occurrence.

Also, the first and second objects of the present invention can be achieved even more effectively because the electrical angle, which correspond to commutation-position skew in rectangular-wave driving which is caused by an armature reaction in the brushless DC-motor, is determined by using functions of values representing four operating conditions of normal-rotation driving, inverse-rotation driving, normal-rotation regenerative braking and inverse-rotation regenerative braking, and armature-reaction effects of the brushless DC-motor.

Furthermore, according to the brushless DC-motor driving controller of the present invention, rotation-angle signals that represent close rotor-rotation angles are used to perform rectangular-wave driving. This allows phase-current commutation positions to be closely controlled.

BRIEF DESCRIPTION OF THE DRAWINGS

In the accompanying drawings:

FIG. 6 is a schematic diagram showing a compensation method for armature reaction in the brushless DC-motor of the embodiment;

DESCRIPTION OF THE PREFERRED EMBODIMENT

Hereinbelow, a description will be given of an embodiment of the present invention with reference to the drawings.

A brushless DC-motor driving controller of the embodiment compensates for torque fluctuations caused by armature reaction.

(1) First Electrical Driving State (Normal-Rotation Driving)

In a first driving state, the rotor rotation direction is clockwise (CW), and the torque direction is also clockwise (CW).

Figure 1A:
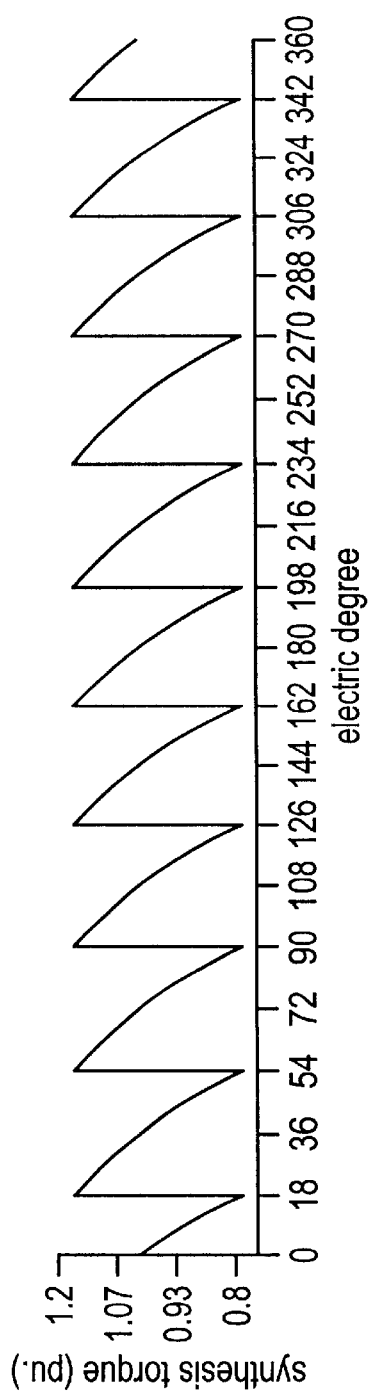
FIGS. 1A to 1C are characteristic graphs showing torque fluctuations due to armature-reaction effects in a conventional brushless DC-motor driving controller.
Figure 1B:
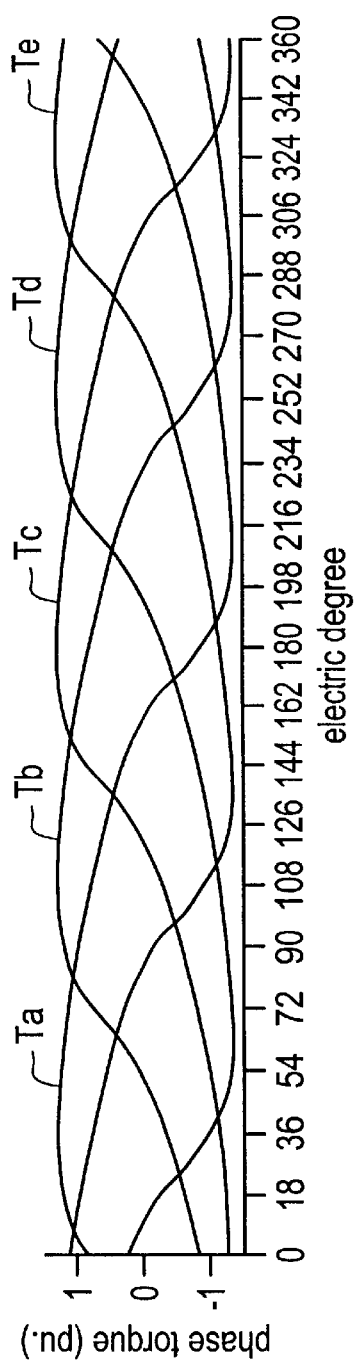
Figure 1C:
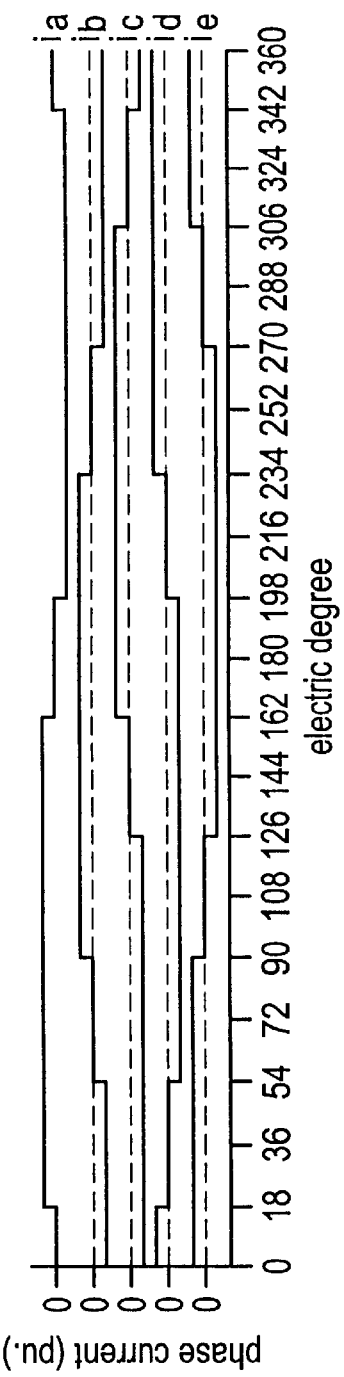
Figure 2A:
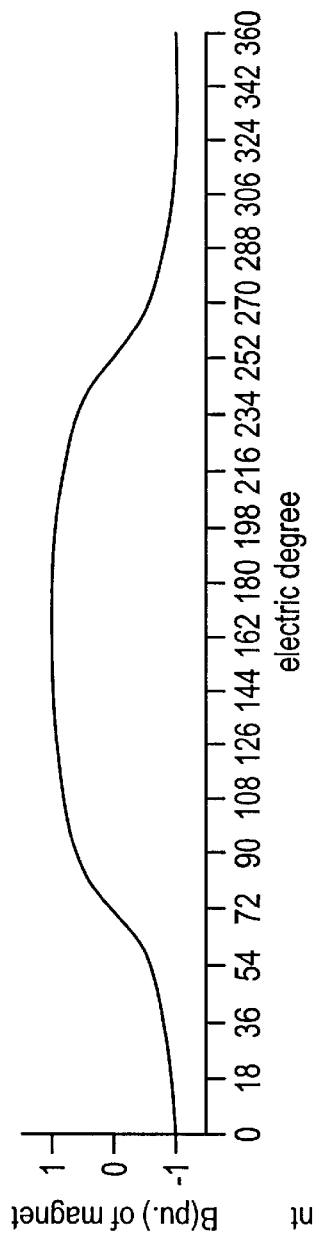
FIGS. 2A to 2C are characteristic graphs showing magnetic-flux density distribution conditions on a rotor magnet surface and in an air gap of a brushless DC-motor of an embodiment when armature reaction is disregarded.
Figure 2B:
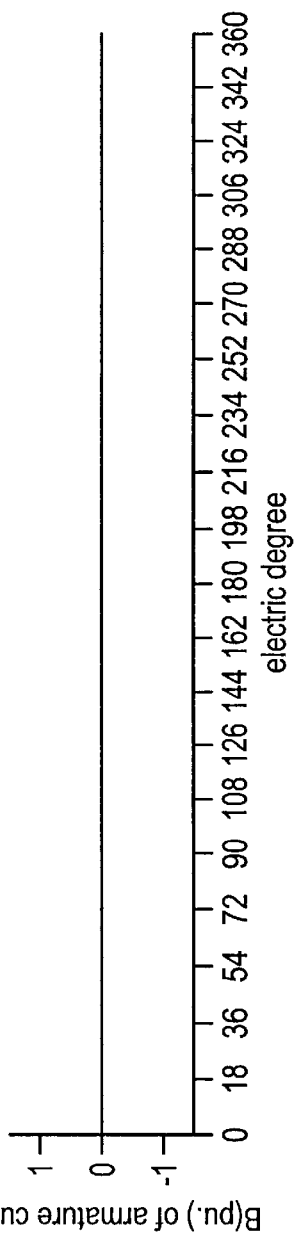
Figure 2C:
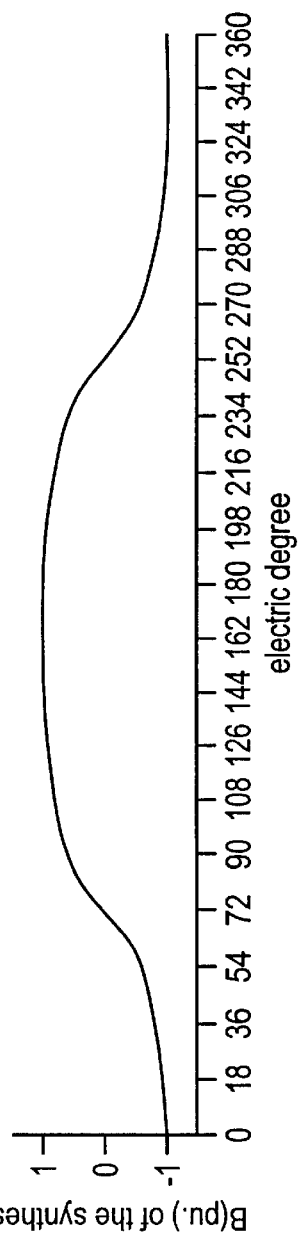

FIGS. 2A to 2C are characteristic graphs showing magnetic-flux density distribution conditions on a rotor magnet surface and in an air gap of a brushless DC-motor when armature reaction is disregarded.

When armature reaction in the brushless DC-motor is disregarded, the magnetic-flux density distribution condition on the magnet surface mainly determines the magnetic-flux density distribution condition in the air gap. FIG. 2C shows a magnetic-flux density distribution condition in the air gap; and FIG. 2A shows a magnetic-flux density distribution condition on the magnet surface.

Figure 3A:
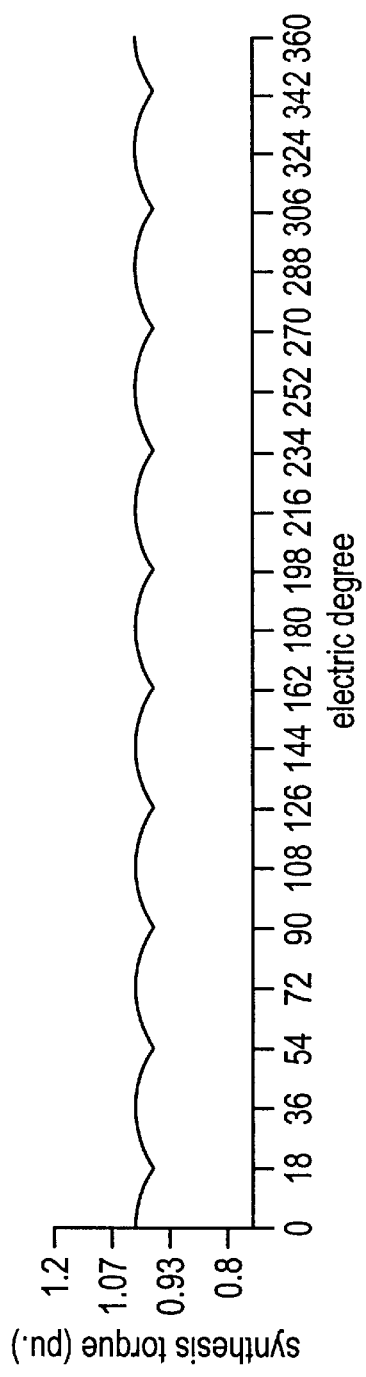
FIGS. 3A to 3C are characteristic graphs showing waveforms of a synthesis torque, stationary-current torques in individual phases, and individual phase currents in the brushless DC-motor when armature reaction is disregarded.
Figure 3B:
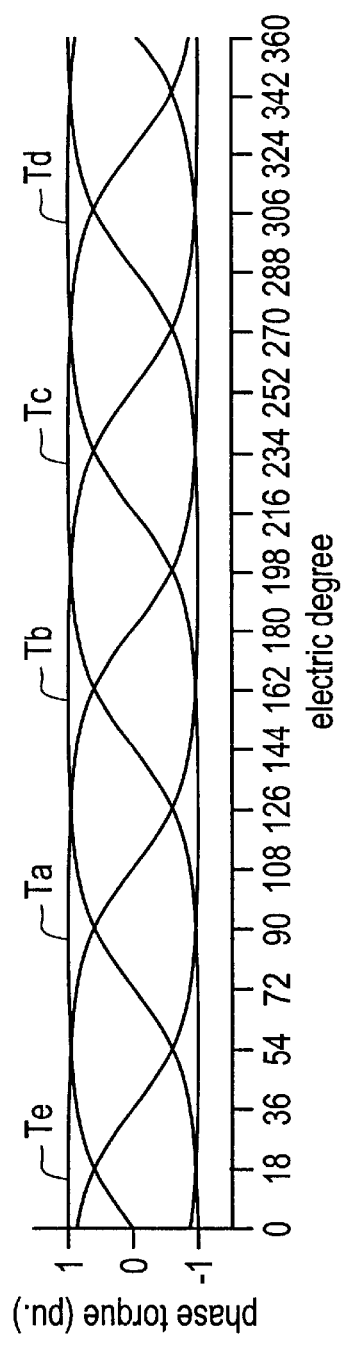
Figure 3C:
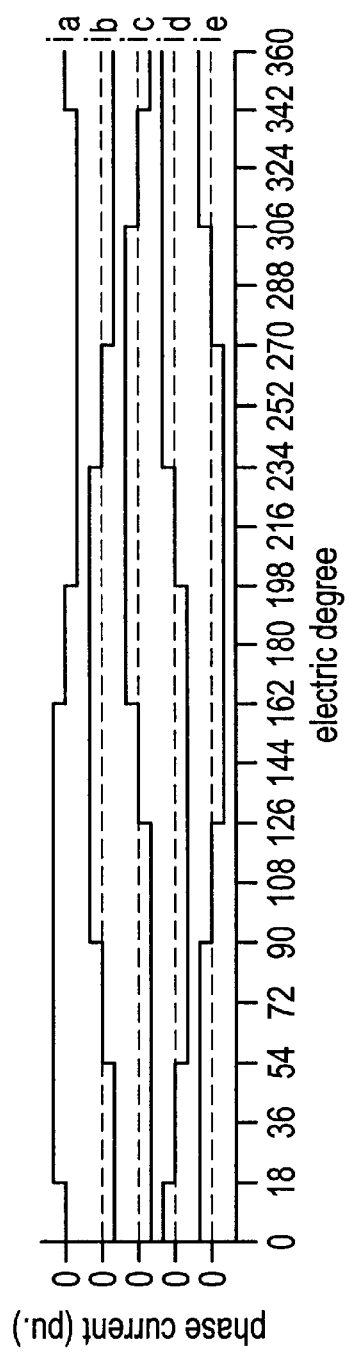

FIGS. 3A to 3C are characteristic graphs showing waveforms of a synthesis torque, stationary-current torques in individual phases, and individual phase currents in the brushless DC-motor when armature reaction is disregarded. When the stationary current flows in individual phases of the brushless DC-motor, electromagnetic torque conditions in individual phases are as shown in FIG. 3B. These conditions are substantially the same as magnetic-flux density distribution conditions in the air gap. For driving a five-phase brushless DC-motor by a four-phase exciting rectangular wave, currents in individual phases are commuted, as shown in FIG. 3C. This provides an electromagnetic torque condition synthesized with the individual phase currents, as shown in FIG. 3A.

Figure 4A:
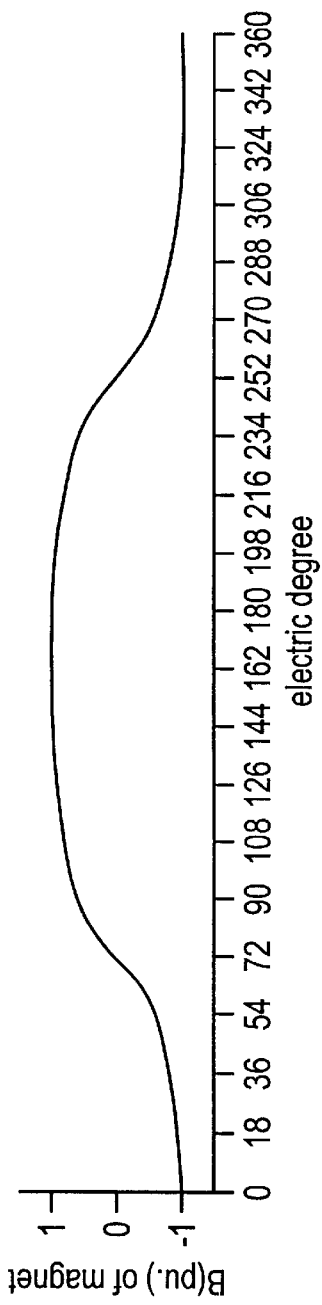
FIGS. 4A to 4C are characteristic graphs showing magnetic-flux density distribution conditions on the rotor magnet surface and in the air gap of the brushless DC-motor when armature reaction is considered in a first driving state.
Figure 4B:
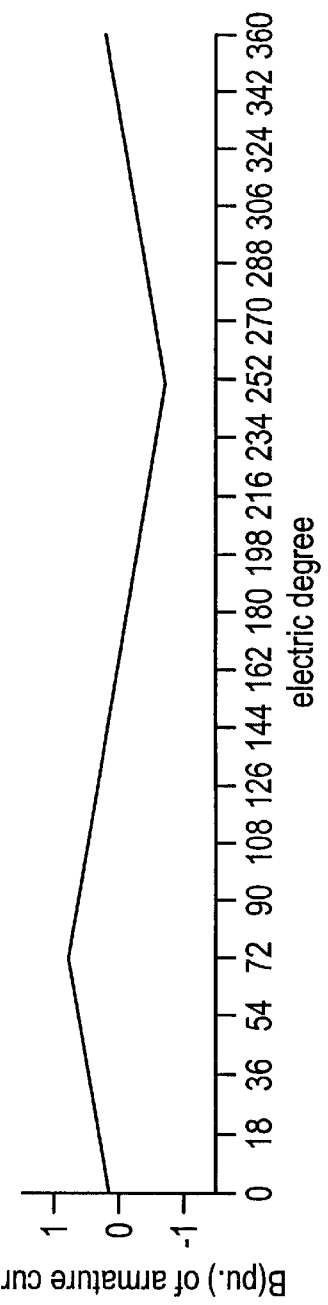
Figure 4C:
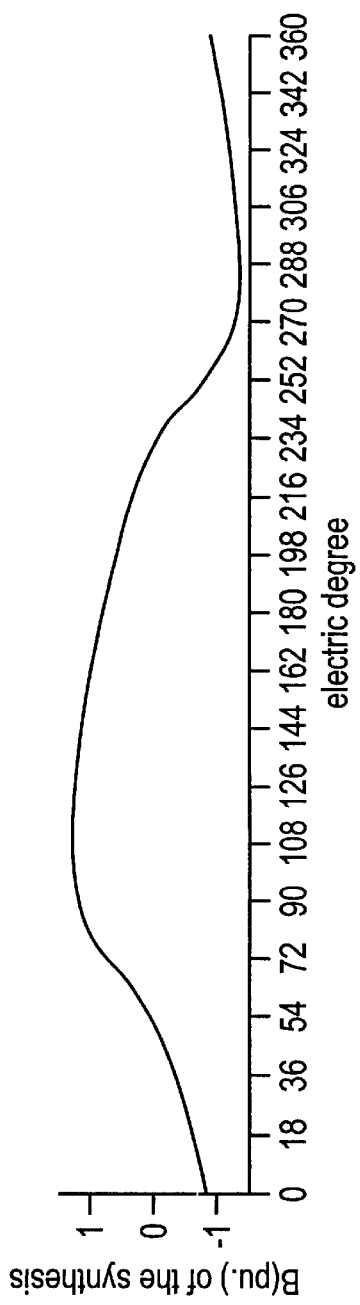

FIGS. 4A to 4C are characteristic graphs showing magnetic-flux density distribution conditions on the rotor magnet surface and in the air gap of the brushless DC-motor when armature reaction is considered in the first driving state.

When armature reaction is considered, the magnetic-flux density distribution condition in the air gap is determined by the synthesis waveform of magnetic-flux density distribution on the magnet surface and magnetic-flux density distribution caused by armature current in the air gap. As shown in FIG. 4C, the synthesis waveform representing the magnetic-flux density distribution. in the air gap is skewed. This skewed air-gap magnetic-flux density distribution causes electromagnetic torque conditions in the individual phases with the stationary current to be skewed, as shown in FIG. 4B.

Figure 5A:
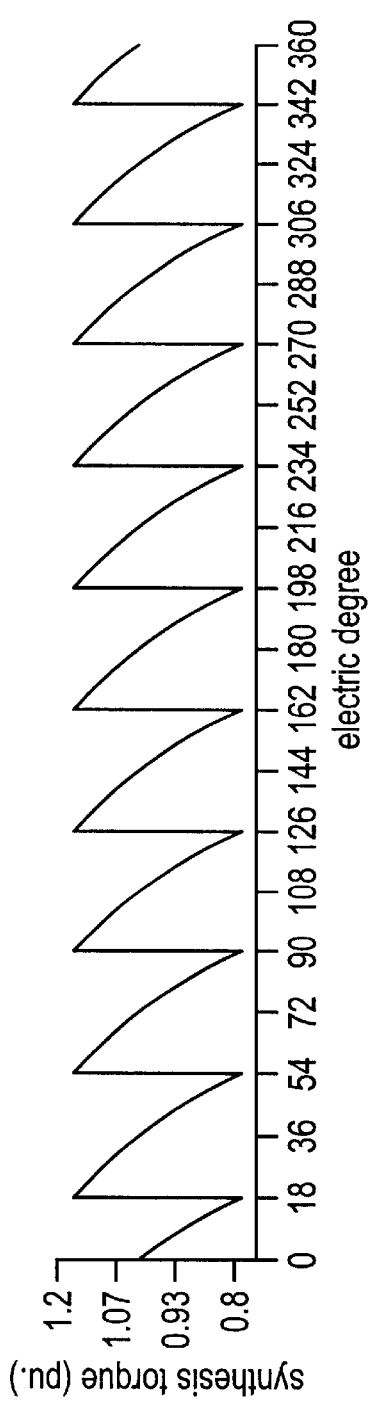
FIGS. 5A to 5C are characteristic graphs showing waveforms of a synthesis torque, stationary-current torques in individual phases, and individual phase currents in the brushless DC-motor when armature reaction is considered in the first driving state.
Figure 5B:
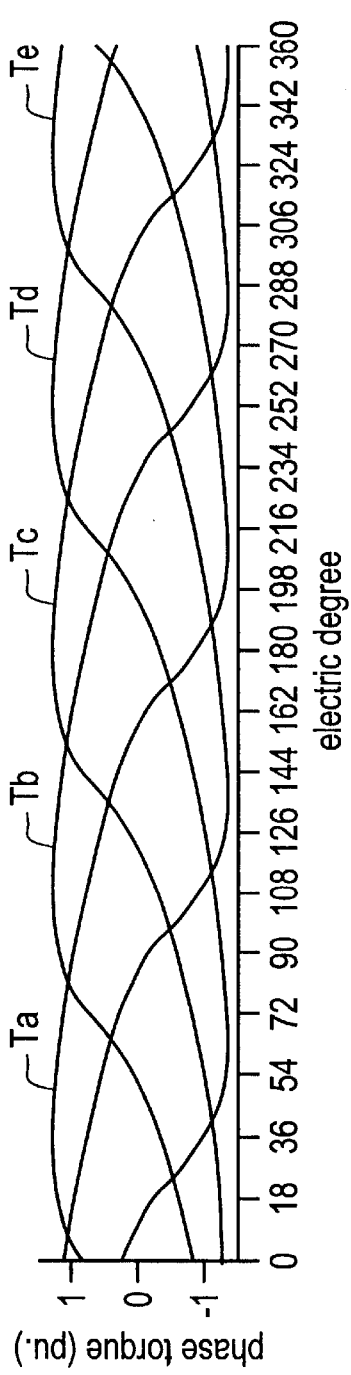
Figure 5C:
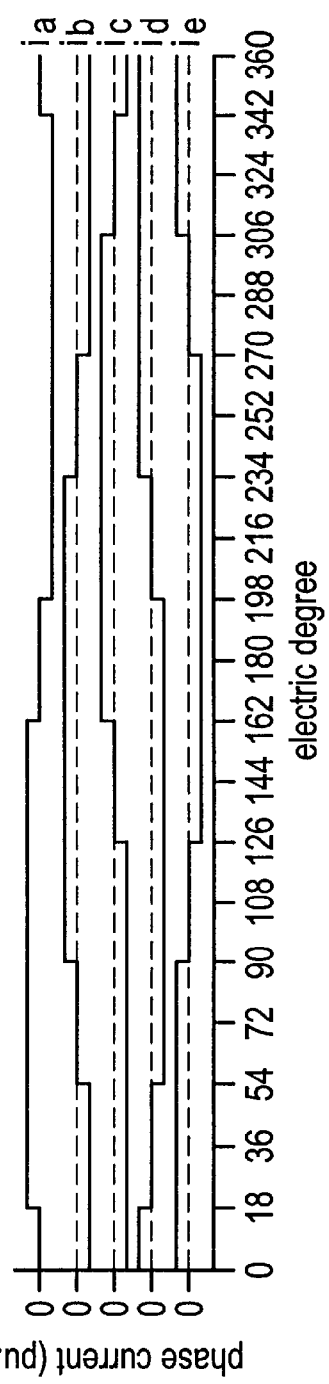

FIGS. 5A to 5C are characteristic graphs showing waveforms of a synthesis torque, stationary-current torques in individual phases, and individual phase currents in the brushless DC-motor when armature reaction is considered in the first driving state. When the motor is excited using currents in the same rectangular waveforms as those in FIG. 3C, electromagnetic torques of two phases at current commutation positions are skewed because of armature reaction. Therefore, these waveforms are discontinuous, providing a synthesis electromagnetic torque condition of the motor shown in FIG. 5A.

With current represented by I, an electrical angle (electric degree) of the commutation position which has been skewed because of armature reaction is expressed in a formula (1) below.

$$\delta a_{CWCW} = f_{CWCW}(I) \tag{1}$$

In the above, the amount of skew in the electrical angle at the commutation position is represented by $\delta a_{CWCW}$.

Now, an electrical angle at a conventional commutation position is assumed to be $\delta b$. With this, the commutation position $\delta ba$ in the brushless DC-motor driving controller of this embodiment is arranged to be a result of shifting from the electrical angle $\delta b$ at the commutation position in the conventional brushless DC-motor to electrical angle $\delta ba$ for compensating for torque fluctuations due to skewed commutation position. The electrical angle $\delta ba$ is obtained from a formula (2) shown below.

$$\delta ba = \delta b - \delta a_{CWCW} (\delta a_{CWCW} = f_{CWCW}(I) \geq 0) \tag{2}$$

In the above, the relationship "$\delta a_{CWCW} = f_{CWCW}(I)$" between the current I and the skewed electrical angle of commutation is obtained by performing analyses of magnetic fields or experiments.

FIG. 6 is a schematic diagram showing a compensation method for armature reaction in the brushless DC-motor of the embodiment. As can be seen in FIG. 6, in the brushless DC-motor driving controller of the embodiment with the rotor position at the electrical angle $\delta ba$ for the current I, a drive pattern according to a rectangular wave references a Hall-element pattern table Tbls ($\delta b$, $Sa_e$) according to an electrical angle δb=δba+δa_{CCCW}, and thereby generates a Hall-element signal Sa_e. According to the Hall-element signal Sa_e, the aforementioned drive pattern then references a drive pattern table Tblt (Sa_e, mtdir, T1_10), and thereby determines an ON-OFF signal T1_10 for a switching element such as an FET. In this case, mtdir represents the direction of electromagnetic torque, which is clockwise (CW). Here, the table Tbls and the table Tblt may be integrated into a single table Tblst (δb, mtdir, T1_10) to obtain a direct drive table pattern T1_10 according to the electrical angle δb.

Figure 7A:
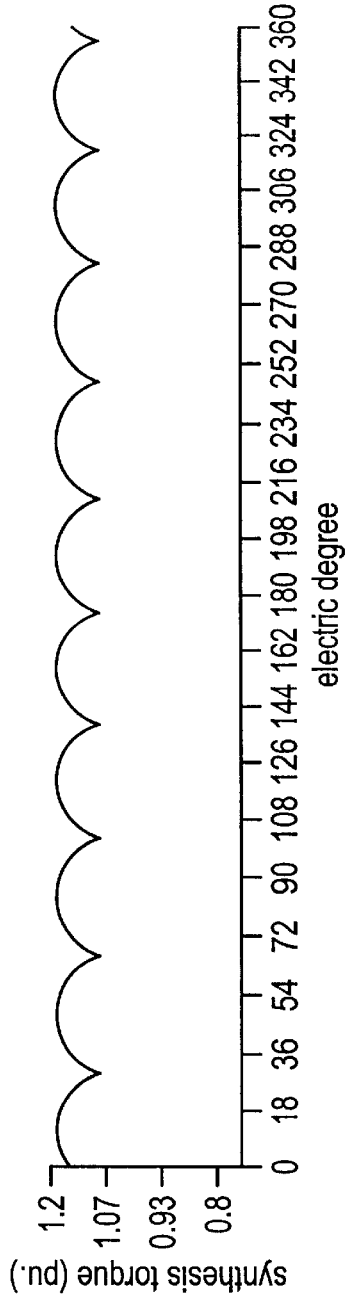
FIGS. 7A to 7C are characteristic graphs showing waveforms of a synthesis torque, stationary current torques in the individual phases, and individual phase currents when armature reaction effects are compensated for in the brushless DC-motor of the embodiment in the first driving state.
Figure 7B:
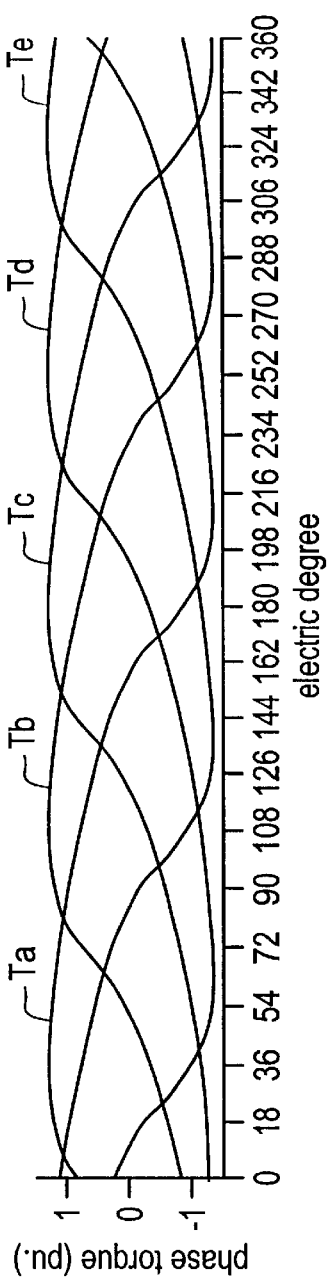
Figure 7C:
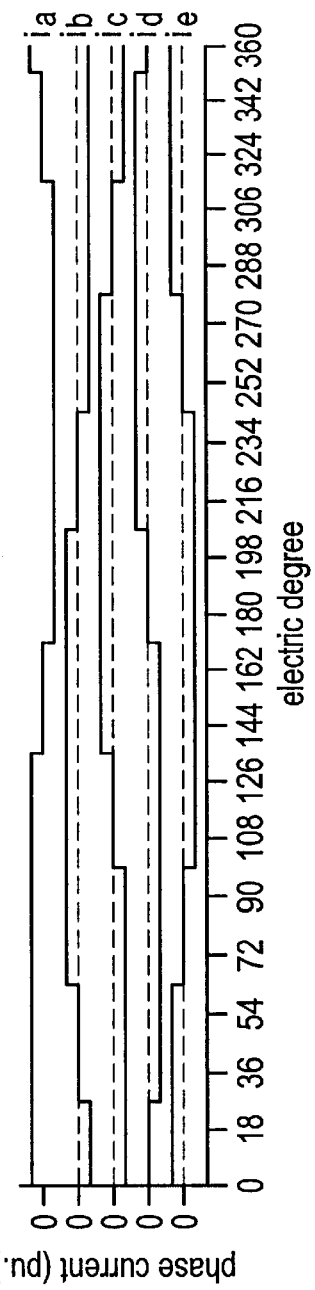

FIGS. 7A to 7C are characteristic graphs showing waveforms of a synthesis torque, stationary current torques in the individual phases, stationary current torques in the individual phases, and currents in the individual phases when armature reaction effects are compensated for in the brushless DC-motor of the embodiment in the first driving state. As a result of shifting the commutation position from the electrical angle δb to the electrical angle δa, torque fluctuations at the commutation position are significantly reduced, providing a synthesis torque as shown in FIG. 7A.

(2) Second Electrical Driving State (Reverse-Rotation Driving)

In a second driving state, the rotor rotation direction is counterclockwise (CCW), and the torque direction is also counter clockwise (CCW).

In the first driving state described above, because the rotor rotation direction is clockwise (CW), the commutation position must be advanced in the CW direction from the conventional commutation position so that the armature reactions caused by torque fluctuations are compensated for. In the second driving state, since the rotor rotation direction is counterclockwise (CCW), the commutation position must be advanced in the CCW direction from the conventional commutation position so that torque fluctuations caused by armature reaction are compensated for. Therefore, the current commutation position in the brushless DC-motor driving controller of the embodiment is shifted from the electrical angle δb, which is the commutation position in the conventional brushless DC-motor driving controller, to the electrical angle δba. The electrical angle δba can be obtained from a formula (3) shown below.

$$\delta ba = \delta b + \delta a_{CCWCCW}(\delta a_{CCWCCW} = f_{CCWCCW}(I) \geq 0) \quad (3)$$

In the above, the electrical angle δa_{CCWCCW}, which is the amount of skew of the commutation position caused by armature reaction, is represented by the function f_{CCWCCW}(I)

(3) First Regenerative Braking State (Normal-Rotation Regenerative Braking)

In a first regenerative braking state, the rotor rotation direction is clockwise (CW), and the torque direction is counterclockwise (CCW).

Figure 8A:
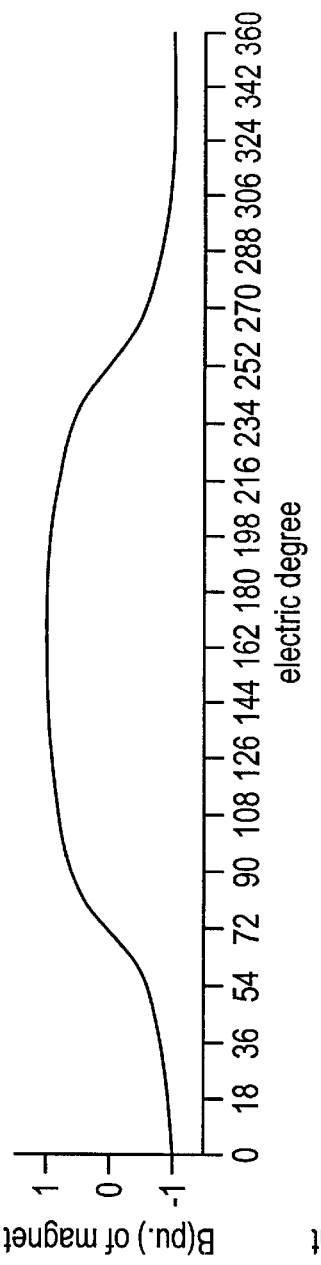
FIGS. 8A to 8C are characteristic graphs showing magnetic-flux density distribution conditions on the rotor magnet surface and the air gap of the brushless DC-motor when armature reaction is considered in a first regenerative braking state.
Figure 8B:
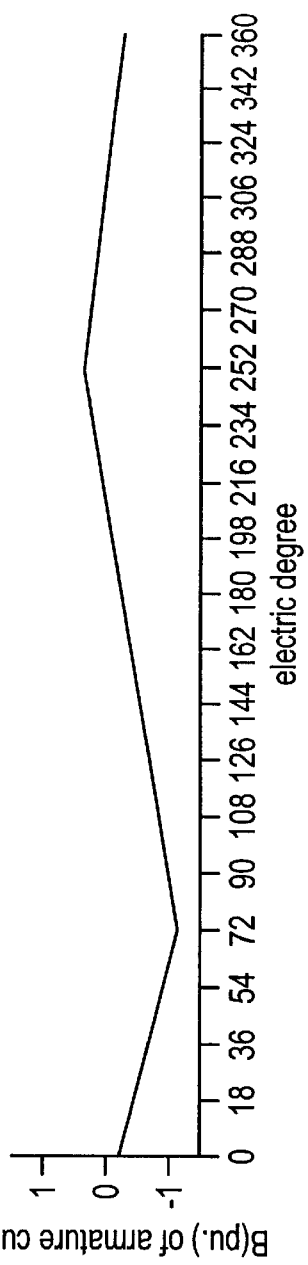
Figure 8C:
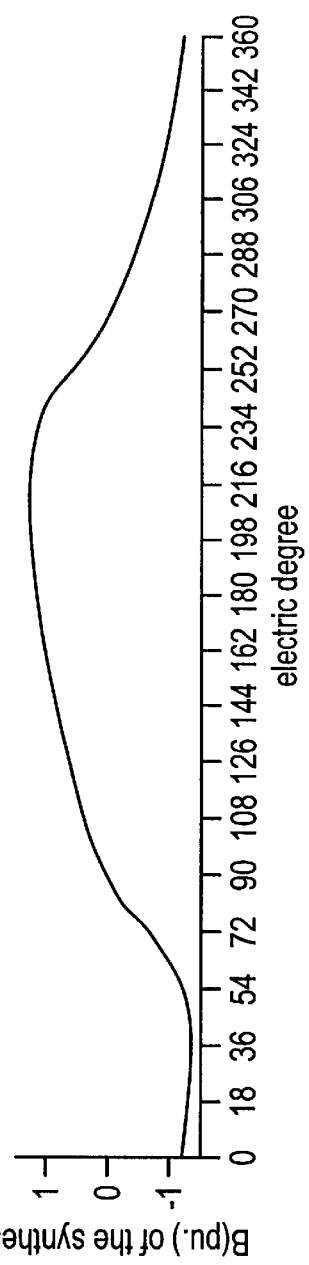
Figure 9A:
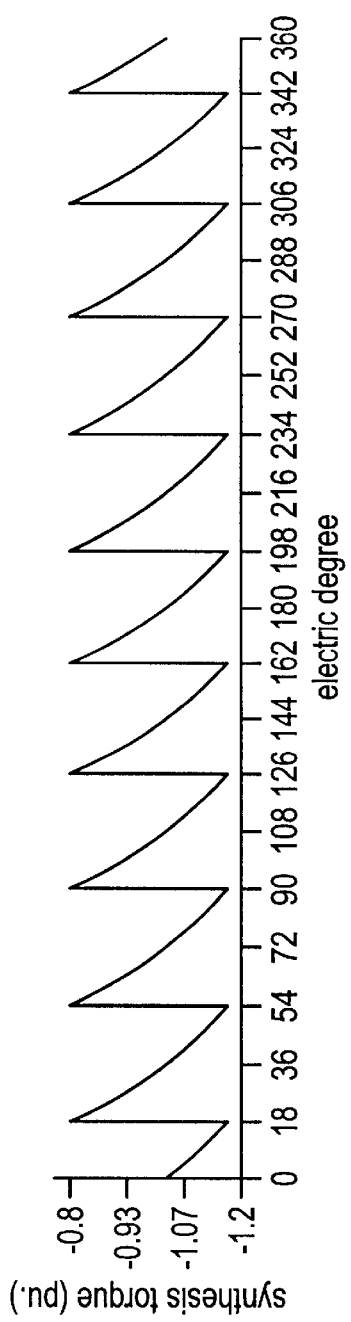
FIGS. 9A to 9C are characteristic graphs showing waveforms of a synthesis torque, stationary current torques in the individual phases, and individual phase currents when armature reaction is considered in the brushless DC-motor in the first regenerative braking state.
Figure 9B:
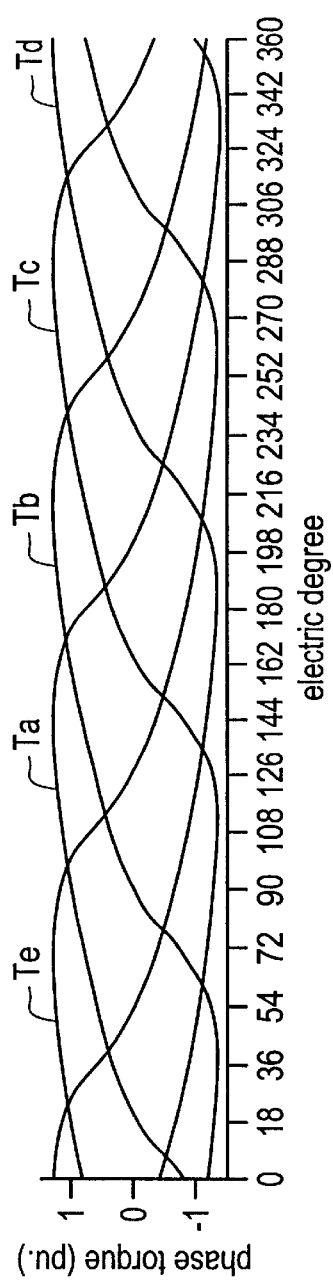
Figure 9C:
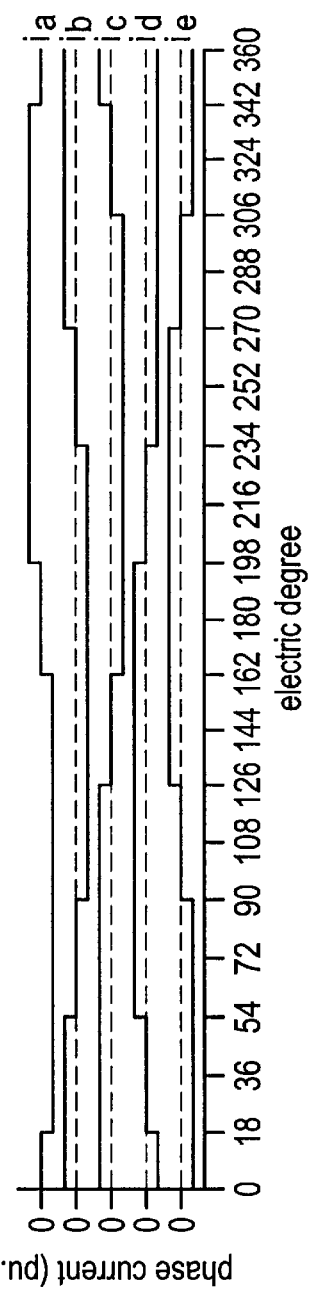

FIGS. 8A to 8C are characteristic graphs showing magnetic-flux density distribution conditions on the rotor magnet surface and in the air gap of the brushless DC-motor when armature reaction is considered in the first regenerative braking state.

In the first regenerative braking state, because the current direction is opposite to that in the first driving state, the magnetic-flux density distribution condition caused by armature current in the air gap is as shown in FIG. 8C. In this case, armature-and-magnet synthesis magnet flux distribution is skewed, as shown in FIG. 8C.

Because of the skewed synthesis magnetic flux distribution, when commutation occurs at the commutation position in the conventional brushless DC-motor driving controller, electromagnetic torque conditions with stationary currents in the individual phases are skewed, as shown in FIG. 7B. FIGS. 7A to 7C are characteristic graphs showing waveforms of a synthesis torque, stationary current torques in the individual phases, and currents in the individual phases when armature reaction is considered in the brushless DC motor in the regenerative braking state.

For compensation for these torque fluctuations caused by armature reaction, the commutation position must be shifted back in the CW direction from the commutation position in the conventional brushless DC-motor driving controller. For this reason, to compensate for the torque fluctuations due to armature reaction, the commutation position in the brushless DC-motor driving controller of the embodiment is arranged to be a result of shifting from the electrical angle δb at the commutation position in the conventional brushless DC-motor to electrical angle δba for compensating for torque fluctuations due to skewed commutation position. The electrical angle δba is obtained from formula (4) shown below.

$$\delta ba = \delta b + \delta a_{CWCCW}(\delta a_{CWCCW} = f_{CWCCW}(I) \geq 0) \quad (4)$$

In the above, the electrical angle δa_{CWCCW} for the amount of skew caused by armature reaction commutation position is represented by the function f_{CWCCW}(I).

Figure 10A:
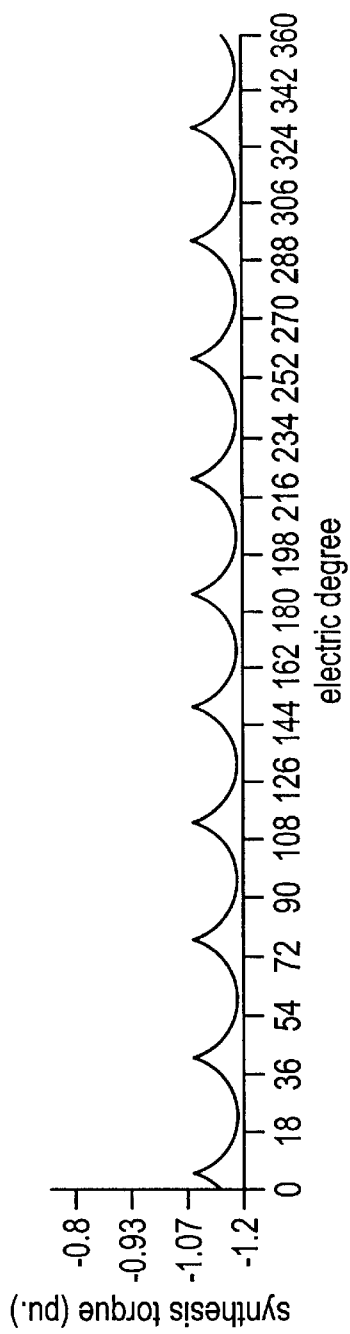
FIGS. 10A to 10C are characteristic graphs showing waveforms of a synthesis torque, stationary current torques in the individual phases, and individual phase currents when armature reaction effects are compensated for in the brushless DC-motor of the embodiment in the first regenerative braking state.
Figure 10B:
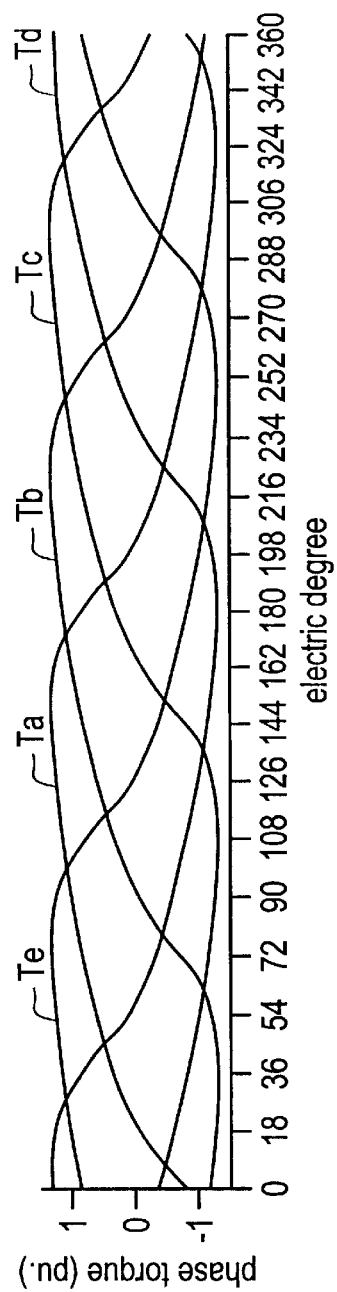
Figure 10C:
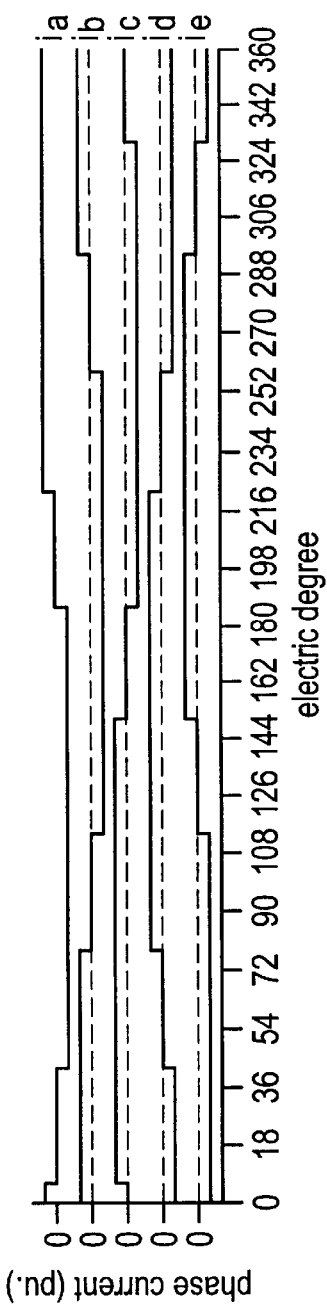

FIGS. 10A to 10C are characteristic graphs showing waveforms of a synthesis torque, stationary current torques in the individual phases, and currents in the individual phases when armature reaction effects are compensated for in the brushless DC-motor of the embodiment in the first regenerative braking state. As a result of shifting of the commutation position from the electrical angle δb to the electrical angle δa, torque fluctuations at the commutation position are significantly reduced, providing a synthesis torque as shown in FIG. 10A.

(4) Second Regenerative Braking State (Inverse-Rotation Regenerative Braking)

In a second regenerative braking state, the rotor rotation direction is clockwise (CW), and the torque direction is counterclockwise (CCW).

In the first regenerative braking state described above, the rotor direction is clockwise (CW), and for compensating for torque fluctuations caused by armature reaction, the commutation position must be shifted back in the CW direction from the commutation position in the conventional brushless DC-motor driving controller. In the second regenerative braking state, however, the rotor direction is counterclockwise(CCW). Therefore, for compensating for the torque fluctuations caused by armature reaction, the commutation position must be shifted back in the CCW direction from the commutation position in the conventional brushless DC-motor driving controller. For this reason, to compensate for the torque fluctuations due to armature reaction, the commutation position in the brushless DC-motor driving controller of the embodiment must be a result of shifting from the electrical angle δb at the commutation position in the conventional brushless DC-motor to electrical angle δba. The electrical angle δba can be obtained from a formula (5) shown below.

$$\delta ba = \delta b - \delta a_{CCWCW}(\delta a_{CCWCW} = f_{CCWCW}(I) \geq 0) \quad (5)$$

In the above, the electrical angle δa_{CCWCW} for the amount of skew of commutation position caused by armature reaction is represented by the function f_{CCWCW}(I).

In these ways, for rectangular-wave driving by using close positioning signals, the brushless DC-motor driving controller of the embodiment can compensate for skew of the current commutation position caused by armature reaction, thereby significantly reducing torque fluctuations during commutation, which are caused by effects of armature reaction.

As above, the present invention has been described with reference to the preferred embodiment. However, the invention is not restricted to the embodiment, and it may be modified in various ways within the scope of the invention.

What is claimed is:

1. A brushless DC-motor driving control system comprising:
   a controller; and
   a position detector, wherein the position detector generates a rotation-angle signal representing rotor-rotation angle or a part thereof in high resolution,
      wherein the controller uses the rotor-rotation angle signal, and performs resolution, and further uses the rotor-rotation angle, and performs rectangular wave-driving, wherein the rotation-angle signal is used to compensate for an electrical angle corresponding to commutation-position skew in rectangular-wave driving which is caused by armature reaction in a brushless DC-motor wherein the electrical angle corresponding to the commutation-position skew is determined by using functions of values representing four operating conditions of normal rotation driving, inverse-rotation driving, normal-rotation regenerative braking and inverse-rotation regenerative braking, and armature-reaction effects of the brushless DC-motor.

2. A brushless DC-motor driving control system according to claim 1, wherein an electrical angle of a new commutation-position is expressed as $\delta ba=\delta b-\delta a$ if said function is $\delta ba=f(I,mtdir,mdir)$, where a motor current:I, a conventional electrical angle of commutation-position: $\delta b$, torque direction:mtdir and rotor direction:mdir.

3. A brushless DC-motor driving control system according to claim 1, wherein the control system drives and controls the brushless DC-motor in an electrical power steering device that uses rotation torque of the brushless DC-motor to support forces required for vehicle-wheel steering.

4. A brushless DC-motor driving control system comprising:
   a controller; and
   a position detector, wherein the position detector generates a rotation-angle signal representing rotor-rotation angle or a part thereof in high resolution,
      wherein the controller uses the rotor-rotation angle signal, and performs resolution, and further uses the rotor-rotation angle, and performs rectangular wave-driving, wherein the rotation-angle signal is used to compensate for an electrical angle corresponding to commutation-position skew in rectangular-wave driving which is caused by armature reaction in a brushless DC-motor,
      wherein the control system drives and controls the brushless DC-motor in an electrical power steering device that uses rotation torque of the brushless DC-motor to support forces required for vehicle-wheel steering.

5. A brushless DC-motor driving control system according to claim 4, wherein the electrical angle corresponding to the commutation-position skew in rectangular-wave driving which is caused by armature reaction in the brushless DC-motor is determined by using functions of values representing four operating conditions of normal-rotation driving, inverse-rotation driving, normal-rotation regenerative braking and inverse-rotation regenerative braking, and armature-reaction effects of the brushless DC-motor.

6. A brushless DC-motor driving control system comprising:
   a controller; and
   a position detector, wherein the position detector generates a rotation-angle signal representing rotor-rotation angle or a part thereof in high resolution,
      wherein the controller uses the rotor-rotation angle signal, and performs resolution, and further uses the rotor-rotation angle, and performs rectangular wave-driving, wherein the rotation-angle signal is used to compensate for an electrical angle corresponding to commutation-position skew in rectangular-wave driving which is caused by armature reaction in a brushless DC-motor,
      wherein said electrical angle $\delta a$ is obtained by a function $f(I, mtdir, mdir)$ based on motor current I, torque direction mtdir and rotor direction mdir.

7. A brushless DC-motor driving control system according to claim 6, wherein driving-pattern-selecting commutation-current electrical angle $\delta b$ is calculated by a function $g(\delta a, \delta ba, mtdir, mdir)$, where said rotation-angle signal: $\delta ba$.

8. A brushless DC-motor driving control system according to claim 7, wherein a motor driving signal is obtained by a function $Tblst(\delta b, mtdir)$ based on the driving-pattern-selecting commutation-current electrical angle $\delta b$ and the torque direction mtdir.

9. A brushless DC-motor driving control method comprising:
   detecting a position using a position detector;
   generating a rotation-angle signal representing rotor-rotation angle or a part thereof in high resolution;
   performing rotation using the rotor-rotation angle; and
   performing rectangular-wave driving after compensating for an electrical angle corresponding to a commutation-position skew, caused by the armature reaction in the brushless DC-motor, using the rotation angle,
      wherein the electrical angle corresponding to the commutation-position skew in rectangular-wave driving is determined by using functions of values representing four operating conditions of normal rotation driving, inverse-rotation driving, normal-rotation regenerative braking and inverse-rotation regenerative braking, and armature-reaction effects of the brushless DC-motor.

10. The method according to claim 9, wherein an electrical angle of a new commutation-position is expressed $\delta ba=\delta b-\delta a$ if said function is $\delta ba=f(I,mtdir,mdir)$, where a motor current:I, a conventional electrical angle of commutation-position:$\delta b$, torque direction:mtdir and rotor direction:mdir.

11. A brushless DC-motor driving control method comprising:
   detecting a position using a position detector;
   generating a rotation-angle signal representing rotor-rotation angle or a part thereof in high resolution;
   performing rotation using the rotor-rotation angle; and
   performing rectangular-wave driving after compensating for an electrical angle corresponding to a commutation-position skew, caused by the armature reaction in the brushless DC-motor, using the rotation angle, wherein
      the control method drives and controls the brushless DC-motor in an electrical power steering device that uses rotation torque of the brushless DC-motor to support forces required for vehicle-wheel steering.

12. The method according to claim 11, wherein the electrical angle corresponding to the commutation-position skew in rectangular-wave driving which is caused by armature reaction in the brushless DC-motor is determined by using functions of values representing four operating conditions of normal-rotation driving, inverse-rotation driving, normal-rotation regenerative braking and inverse-rotation regenerative braking, and armature-reaction effects of the brushless DC-motor.

13. A brushless DC-motor driving control method comprising:

detecting a position using a position detector;

generating a rotation-angle signal representing rotor-rotation angle or a part thereof in high resolution;

performing rotation using the rotor-rotation angle; and performing rectangular-wave driving after compensating for an electrical angle corresponding to a commutation-position skew, caused by the armature reaction in the brushless DC-motor, using the rotation angle, wherein, the control method drives and controls the brushless DC-motor in an electrical power steering device that uses rotation torque of the brushless DC-motor to support forces required for vehicle-wheel steering.

14. A brushless DC-motor driving control method comprising:

detecting a position using a position detector;

generating a rotation-angle signal representing rotor-rotation angle or a part thereof in high resolution;

performing rotation using the rotor-rotation angle; and performing rectangular-wave driving after compensating for an electrical angle corresponding to a commutation-position skew, caused by the armature reaction in the brushless DC-motor, using the rotation angle, wherein, wherein said electrical angle $\delta a$ is obtained by a function f(I, mtdir, mdir) based on motor current I, torque direction mtdir and rotor direction mdir.

15. The method according to claim 14, wherein driving-pattern-selecting commutation-current electrical angle $\delta b$ is calculated by a function g($\delta a$, $\delta ba$, mtdir, mdir), where said rotation-angle signal: $\delta ba$.

16. The method according to claim 15, wherein a motor driving signal is obtained by a function Tblst($\delta b$, mtdir) based on the driving-pattern-selecting commutation-current electrical angle $\delta b$ and the torque direction mtdir.

* * * * *